(12) United States Patent
Wu et al.

(10) Patent No.: US 8,526,886 B2
(45) Date of Patent: Sep. 3, 2013

(54) WIRELESS COMMUNICATION DEVICE AND METHOD FOR CONTROLLING BEAM TO BE TRANSMITTED

(75) Inventors: Jianming Wu, Kawasaki (JP); Tomohiko Taniguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/315,988

(22) Filed: Dec. 9, 2011

(65) Prior Publication Data

US 2012/0077530 A1 Mar. 29, 2012

Related U.S. Application Data

(62) Division of application No. 12/407,107, filed on Mar. 19, 2009, now Pat. No. 8,095,074.

(30) Foreign Application Priority Data

Jun. 19, 2008 (JP) ................................. 2008-160763

(51) Int. Cl.
*H04B 1/00* (2006.01)
*H04B 15/00* (2006.01)
(52) U.S. Cl.
USPC ..................................... 455/63.4; 455/562.1
(58) Field of Classification Search
None
See application file for complete search history.

(56) References Cited

U.S. PATENT DOCUMENTS

| | | | |
|---|---|---|---|
| 5,543,806 A | 8/1996 | Wilkinson | |
| 6,593,882 B1 | 7/2003 | Kim et al. | |
| 6,989,797 B2 | 1/2006 | Gothard et al. | |
| 7,206,608 B1* | 4/2007 | Wu et al. | 455/562.1 |
| 7,302,232 B2 | 11/2007 | Takatori et al. | |
| 2004/0001554 A1* | 1/2004 | Sun et al. | 375/260 |
| 2006/0292994 A1 | 12/2006 | Oura et al. | |
| 2007/0123262 A1 | 5/2007 | Proctor, Jr. | |
| 2008/0079634 A1* | 4/2008 | Nakamura | 342/368 |

FOREIGN PATENT DOCUMENTS

| | | | |
|---|---|---|---|
| JP | 2001-251233 | * | 9/2001 |
| JP | 2002-84227 | | 3/2002 |
| JP | 2005-520386 | | 7/2005 |
| JP | 2007-6365 | | 1/2007 |
| JP | 2007-219927 | | 8/2007 |
| WO | 03/077433 | | 9/2003 |

OTHER PUBLICATIONS

Shiann-Shiun Jeng, et al. "Experimental Evaluation of Smart Antenna System Performance for Wireless Communications" IEEE Transactions on Antennas and Propagation, vol. 46, No. 6, Jun. 1998, pp. 749-757.

(Continued)

*Primary Examiner* — Tuan T Lam
(74) *Attorney, Agent, or Firm* — Katten Muchin Rosenman LLP

(57) ABSTRACT

A controller controls the direction of a beam to be transmitted toward a correspondent wireless communication device to transmit a first wireless signal to the correspondent wireless communication device, and controls the direction of the beam within a predetermined shift from the direction of the first wireless signal, thereby transmitting a second wireless signal at a first timing before or a second timing after the timing of the control for the first wireless signal.

3 Claims, 11 Drawing Sheets

(56) References Cited

OTHER PUBLICATIONS

"IEEE Std 802.16e, Part 16: Air Interface for Fixed and Mobile Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.

Y.M. Tao, et al. "Lens-Fed Multiple Beam Array for Millimeter Wave Indoor Communications" IEEE vol. 4, Jul. 13-18, 1997, pp. 2206-2209.

Don H. Johnson, et al. "Array Signal Processing: Concepts and Techniques" Prentice-Hall Inc., 1993, pp. 349-373.

R.T. Compton, Jr. "Adaptive Antennas Concepts and Performance" Prentice-Hall Inc., 1988, pp. 18-45.

Barry D. Van Veen, et al. "Beamforming: A Versatile Approach to Spatial Filtering" IEEE ASSP Magazine, Apr. 1988, pp. 4-24.

Dimitris A. Pados, et al. "An Iterative Algorithm for the Computation of MVDR Filter" IEEE Transactions on Signal Processing, vol. 49, No. 2, Feb. 2001, pp. 290-300.

Ralph O. Schmidt. "Multiple Emitter Location and Signal Parameter Estimation" IEEE Transactions on Antennas and Propagation, vol. AP-34, No. 3, Mar. 1986, pp. 276-280.

Richard Roy, et al. "ESPRIT—Estimation of Signal Parameters Via Rotational Invariance Techniques" IEEE Transactions on Acoustics, Speech and Signal Processing, vol. 37, No. &, Jul. 1989, pp. 984-995.

Office Action dated Aug. 22, 2011 from the corresponding U.S. Appl. No. 12/407,107.

Notice of Allowance dated Oct. 28, 2011 from the corresponding U.S. Appl. No. 12/407,107.

Notification of Reason(s) for Refusal mailed on Apr. 17, 2012, from corresponding Japanese Application No. 2008-160763.

* cited by examiner

WIRELESS COMMUNICATION DEVICE AND METHOD FOR CONTROLLING BEAM TO BE TRANSMITTED

CROSS-REFERENCE TO RELATED APPLICATION(S)

This application is a divisional application of U.S. patent application Ser. No. 12/407,107, filed on Mar. 19, 2009, which issued as U.S. Pat. No. 8,095,074 on Jan. 10, 2012 and which claims the benefit of priority of the prior Japanese Application No. 2008-160763 filed on Jun. 19, 2008 in Japan, the entire contents of which are hereby incorporated by reference.

FIELD

The embodiment(s) discussed herein is (are) related to a wireless communication device and a method for controlling a beam to be transmitted.

BACKGROUND

Beamforming transmission is one of the wireless communication techniques, and has been researched and developed in a variety of fields such as radar techniques, sonar techniques, earthquake seismology, and medical devices such as an ultrasonograph. In these years, this beamforming transmission has been also introduced into standards such as IEEE (Institute of Electrical and Electronics Engineers) 802.16e and LTE (Long Term Evolution) of 3GPP (3rd Generation Partnership Project).

The beamforming transmission can provide many practical functions not implemented in other solutions. For example, the beamforming transmission can enhance cell throughput gain by multi-user transmission of individual beams defining multi-beams toward different user equipments (UEs), and extend a receiving area (coverage) by beamforming gain.

The beamforming transmission can be classified into two types. One is fixed-beamforming transmission, which utilizes spatial processing by an antenna array to fix a pattern of a beam to be transmitted. The other is adaptive beamforming transmission, which also utilizes a spatial processing manner to adaptively define a beam to be transmitted based on both a desired wave and an interference wave.

Fixed multi-beam transmission is used in order to, for example, increase the number of simultaneously active users (UEs), and can provide high (communication) capacity in totality depending on the number of the beams or the antenna arrays. In order to achieve high performance in the fixed multi-beam transmission, optimum beams must be selected for transmission and reception of the independent UEs. This can improve SINR (Signal-to-Interference and Noise power Ratio). The fixed multi-beam can be generated by, for example, a Rotman lens.

In contrast, the adaptive beamforming transmission is designed so as to increase its substantive (communication) capacity. This technique utilizes spatial processing by the antenna array, and requires optimum combination in order to improve its overall system performance. Optimum synthesis of beamforming with an adaptive array antenna optimises response of a beamformer so as to minimize the influence of noise from directions other than that of a desired signal and of interference on the output of the response.

A weight (coefficient) for the adaptive (optimum) beamforming is selected on the basis of, for example, use of MSC (Multiple Side-lobe Canceller) and RS (Reference Signal), Max-SNR (Signal to Noise Ratio), LCMV (linearly constrained minimum variance beamforming), and MVDR (Minimum Variance Distortion-less Response).

Such conventional technology about the adaptive beamforming is disclosed in, for example, the following documents.

[Patent Document 1] Japanese Laid-open Patent Publication No. 2007-6365

[Patent Document 2] Published Japanese Translation of a PCT Application, No. 2005-520386

[Nonpatent Document 1] S.-S. Jeng, G. Okamoto, G. Xu, H.-P. Lin, and W. Vogel, "Experimental evaluation of smart antenna system performance for wireless communications", IEEE Trans. Antenna Propag., vol. 46, pp. 749-757, 1998.

[Nonpatent Document 2] IEEE 802.16e, Draft IEEE Standard for Local and Metropolitan Area networks, Oct. 14, 2005.

[Nonpatent Document 3] Y. M. Tao, G. Y. Delisle, "Lens-fed multiple beam array for millimeter wave indoor communications", Volume 4, pp. 2206-2209, Jul. 13-18, 1997.

[Nonpatent Document 4] D. H. Johnson and D. E. Dudgeon, Array Signal Processing: Concepts and Techniques, Prentice-Hall, Inc., 1993.

[Nonpatent Document 5] R. T. Compton, Jr., Adaptive Antennas: Concepts and Performance, Prentice-Hall, Englewood Clitts, N.J., 1988.

[Nonpatent Document 6] B. D. V. Veen and K. M. Buckley, "Beamforming: a versatile approach to spatial filtering", IEEE ASSP Magazine, pp. 4-23, April 1988.

[Nonpatent Document 7] D. A. Pados and G. N. Karystinos, "An iterative algorithm for the computation of the MVDR filter", IEEE Trans. On Signal Processing. Vol. 49, No 2, February 2001.

[Nonpatent Document 8] R. O. Schmidt, "Multiple emitter location and signal parameter estimation", IEEE Trans. Antennas Propag., vol. 34, pp. 276-280, March 1986.

[Nonpatent Document 9] R. Roy and T. Kailath, "ESPRIT: Estimation of signal parameters via rotational invariance techniques", IEEE Trans. Acoust., Speech, Signal Process., vol. 37, pp. 984-995, July 1989.

However, in the conventional technology, a transmitter such as a base station (BS) merely directs a beam to be directly transmitted toward a UE selected (scheduled) as a communication partner. Therefore, depending on directing the transmitted beam, interference with the receiving UE may significantly change. Such a change may affect the received quality of a wireless communication device such as SINR.

SUMMARY (1) According to an aspect of the embodiment, an apparatus includes a wireless communication device capable of controlling the direction of a beam to be transmitted including: an adaptive array antenna, and a controller for controlling the direction of the beam radiating from the adaptive array antenna; wherein the controller controls the direction of the beam to be transmitted toward a correspondent wireless communication device to transmit a first wireless signal to the correspondent wireless communication device, and controls the direction of the beam within a predetermined shift from the direction of the first wireless signal, thereby transmitting a second wireless signal at a first timing before or a second timing after the timing of the control for the first wireless signal.

(2) According to an aspect of the embodiment, an apparatus includes a wireless communication device capable of controlling the direction of beams to be transmitted including: an adaptive array antenna, and a controller for controlling the directions of the beams radiating from the adaptive array antenna; wherein the controller controls the order of transmission of the beams toward at least three correspondent wireless communication devices based on the directions of the beams corresponding to the correspondent wireless communication devices.

(3) According to an aspect of the embodiment, a method includes a method for controlling a beam to be transmitted by a wireless communication device capable of controlling the direction of the transmitted beam by an adaptive array antenna, the method including: controlling transmission of a beam to a correspondent wireless communication device to transmit a first wireless signal to the correspondent wireless communication device; and controlling the direction of the beam within a predetermined shift from the direction of the first wireless signal, thereby transmitting a second wireless signal at a first timing before or a second timing after the timing of the control for the first wireless signal.

(4) According to an aspect of the embodiment, a method includes a method for controlling a beam to be transmitted by a wireless communication device capable of controlling the direction of beams to be transmitted by an adaptive array antenna, the method including: controlling the order of transmission of the beams toward at least three correspondent wireless communication devices based on the directions of the beams corresponding to the correspondent wireless communication devices.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWING(S)

DESCRIPTION OF EMBODIMENT(S)

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

(1) Embodiment (1.1) Flash Light Effect

Some topics on beamforming techniques are discussed. For example, these topics include a measurement (estimation) of a direction of arrival (DoA), a balance of transmitted power for a multi-user interference, a feedback error of a weight (coefficient) for an adaptive beam, or a flash light effect in other receivers irregularly caused by a transmitted beam. In the topics, the flash light effect has hardly been discussed in system level evaluations.

Accordingly, this embodiment is focused on the flash light effect to propose a method for reducing the flash light effect.

Figure 1:
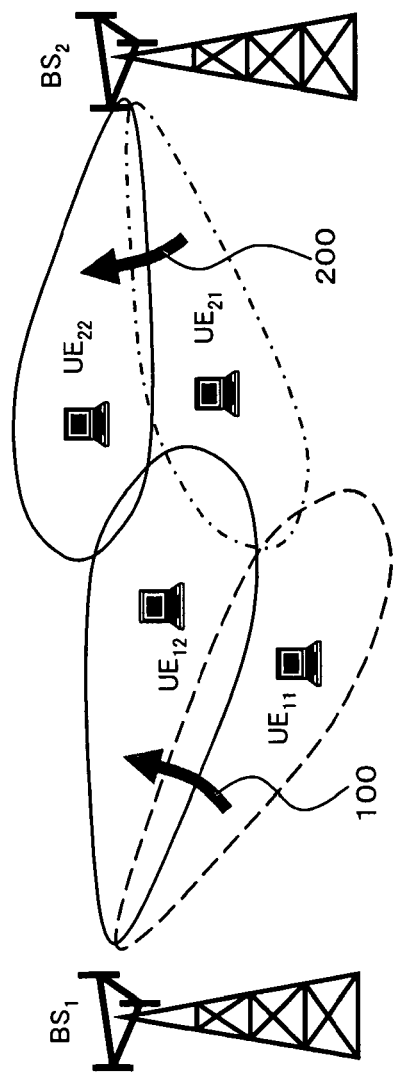
FIG. 1 illustrates a potential flash light effect in a wireless (mobile) communication system in accordance with an embodiment.

With reference to FIG. 1, the potential flash light effect in a wireless (mobile) communication system will be described. This system includes base stations $BS_1$ and $BS_2$ being two exemplary wireless communication devices. These base stations $BS_1$ and $BS_2$ each have a wireless area (cell or sector), and communicate by wireless with a UE as one or more exemplary wireless communication devices in the area.

For example, in FIG. 1, the base station $BS_1$ can communicate by wireless with two UEs ($UE_{11}$ and $UE_{12}$) while the base station $BS_2$ can communicate by wireless with two UEs ($UE_{21}$ and $UE_{22}$). This wireless communication may be achieved by beamforming. The beamforming is a technique capable of controlling the direction of a beam to be transmitted by an adaptive array antenna. Meanwhile, a suffix x in $UE_{xy}$ indicates that $UE_{xy}$ resides in the wireless area of the base station $BS_x$ and can communicate with $BS_x$, and a suffix y in $UE_{xy}$ indicates the number (index) of the UEs in the wireless area of $BS_x$.

Now, for example, by switching the communication opponent (active UE) from $UE_{11}$ to $UE_{12}$ in $BS_1$, the direction of the beam to be transmitted by beamforming is changed as indicated by an arrow 100. In this case, interference with $UE_{21}$ in the wireless area of $BS_2$ suddenly occurs by the beam after the switching.

For example, by switching the active UE from $UE_{21}$ to $UE_{22}$ in $BS_2$, the direction of the beam to be transmitted is changed as indicated by an arrow 200. In this case, interference with $UE_{12}$ in the wireless area of $BS_1$ by the transmitted beam from $BS_2$ suddenly disappears by the switching.

As described above, a phenomenon that interference with the UE in the adjacent cell suddenly occurs and disappears is referred to as a flash light effect. The flash light effect can cause deterioration of the received quality of the UE as a receiver such as SINR estimation.

Figure 2:
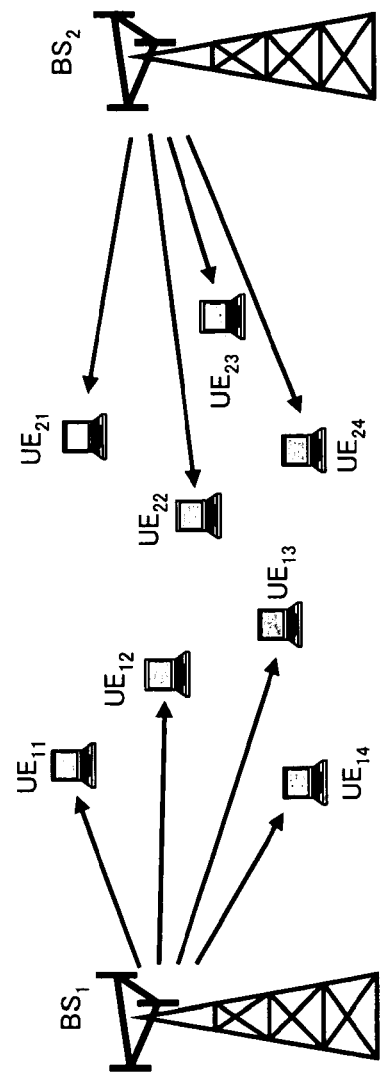
FIG. 2 illustrates a potential flash light effect in a wireless (mobile) communication system in accordance with an embodiment.
Figure 3:
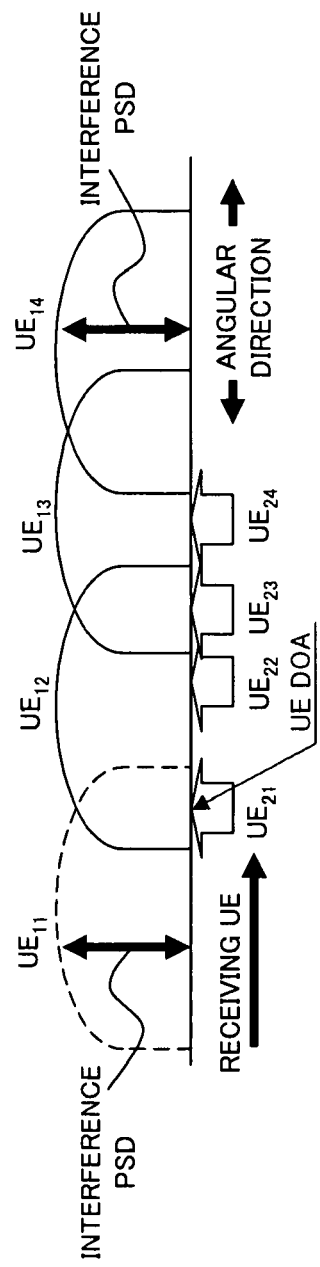
FIG. 3 illustrates an exemplary pattern of a PSD (power spectral density) of a beam to be transmitted from one of the BSs illustrated in FIG. 2.
Figure 4:
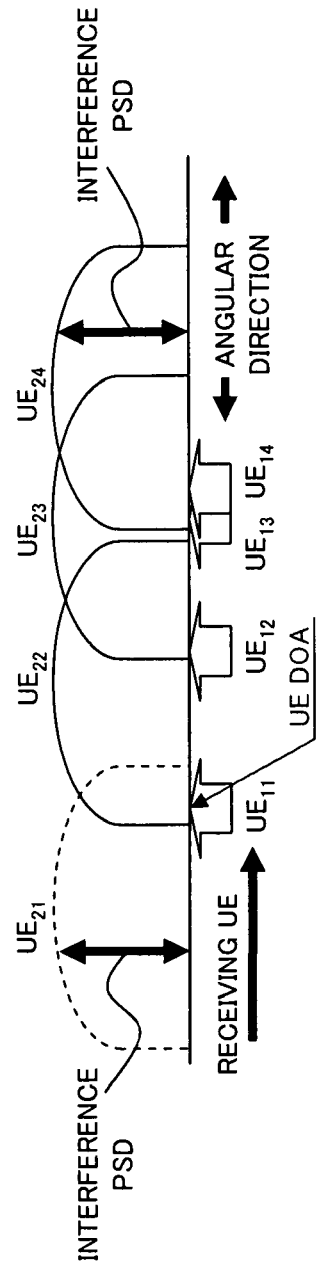
FIG. 4 illustrates an exemplary pattern of a PSD (power spectral density) of a beam to be transmitted from the other BS illustrated in FIG. 2.

With reference to FIGS. 2 to 4, the flash light effect will be described in more detail. FIG. 2 illustrates that $BS_1$ schedules the four UEs ($UE_{11}$, $UE_{12}$, $UE_{13}$, and $UE_{14}$) to communicate therewith while $BS_2$ schedules the four UEs ($UE_{21}$, $UE_{22}$, $UE_2$, and $UE_{24}$) to communicate therewith. For convenience of the description, it is assumed that $BS_1$ and $BS_2$ each transmit the same beam pattern with the same electric power in different angular directions to the wireless areas.

It is assumed that a power spectral density (PSD) of the beam transmitted from $BS_1$ to each of $UE_{11}$, $UE_{12}$, $UE_{13}$, and $UE_{14}$ has a pattern, for example, as illustrated in the upper stage of FIG. 3. Meanwhile, a horizontal axis in FIG. 3 is a direction (angle) scale of the transmitted beam centering on $BS_1$. For example, the direction of the transmitted beam in the cell of $BS_1$ is in the range of 0° to 360°. Therefore, in three sectors obtained by dividing this cell by three, the direction of the transmitted beam is in the range of 0° to 120° for each sector. The same is true of $BS_2$.

$UE_{21}$, $UE_{22}$, $UE_{23}$, and $UE_{24}$ in the wireless area of $BS_2$ adjacent to that of $BS_1$ are interfered with by the transmitted beams (PSD) from $BS_1$ depending on the respective positions (DoA).

For example, assuming that the UEs are located as illustrated in FIG. 2, $UE_{21}$ is interfered with by the transmitted beams directed from $BS_1$ to $UE_{11}$ and $UE_{12}$ while $UE_{22}$ is interfered with by the transmitted beam directed from $BS_1$ to $UE_{12}$. Similarly, $UE_{23}$ is interfered with by the transmitted beams directed from $BS_1$ to $UE_{12}$ and $UE_{13}$ while $UE_{24}$ is interfered with by the transmitted beams directed from $BS_1$ to $UE_{13}$.

The same is true of the beams transmitted from $BS_2$. For example, it is assumed that the beam (PSD) transmitted from $BS_2$ to each of $UE_{21}$, $UE_{22}$, $UE_{23}$, and $UE_{24}$ has a pattern as illustrated in the upper stage of FIG. 4. In this case, assuming that the UEs are located as illustrated in FIG. 2, $UE_{11}$ is interfered with by the transmitted beams directed from $BS_2$ to $UE_{21}$ and $UE_{22}$ while $UE_{12}$ is interfered with by the transmitted beams directed from $BS_2$ to $UE_{22}$ and $UE_{23}$. Similarly, $UE_{13}$ and $UE_{14}$ are interfered with by the transmitted beams directed from $BS_2$ to $UE_{23}$ and $UE_{24}$.

Now, as illustrated in FIG. 3, it is assumed that the active UE in $BS_1$ is changed from $UE_{11}$ to $UE_{14}$ by scheduling of $BS_1$ whereas the active UE in $BS_2$ (for example, $UE_{21}$) is not changed. In this case, the transmitted beam directed from $BS_1$ to $UE_{11}$ is directed (switched) to $UE_{14}$. Then, the interference with $UE_{21}$ by the beam (PSD) before the switching disappears (see a dotted pattern), which may cause significant change in the interference.

On the contrary, by changing the active UE in $BS_1$ from $UE_{14}$ to $UE_{11}$ whereas the active $UE_{21}$ in BS; is not changed, the transmitted beam directed from $BS_1$ to $UE_{14}$ is directed (switched) to $UE_{11}$. Then, $UE_{21}$ is interfered with by the beam (PSD) after the switching, which may cause significant change in the interference.

In FIG. 4, the active UE in $BS_2$ is changed from $UE_{21}$ to $UE_{24}$ or inversely from $UE_{24}$ to $UE_{21}$ by scheduling of $BS_2$ whereas the active UE (for example, $UE_{11}$) in $BS_1$ is not changed, which may cause similar change in the interference.

An adaptive beamforming transmission provides many advantageous effects such as high beamforming gain and support for many active UEs at the same time. However, the flash light effect may also occur, which may lead to significant change in interference with a UE in an adjacent cell (or sector).

In current standards such as High Speed Downlink Packet Access (HSDPA), WiMAX, and LTE, significant change in interference adversely affects SINR. This makes determination of (adaptive) modulation and channel coding scheme (MCS) inaccurate. This may also deteriorate sector (or cell) throughput or user coverage.

This influence is similar to that in, for example, a UE rapidly moving at the speed of 120 km/h. In such a situation, even a UE having a significantly high SINR may preclude packet communication at a high data transfer speed because a larger margin for SINR is required in order to surely complete the packet transfer. Such a decrease in performance cannot be accepted.

In fixed beamforming transmission, the flash light effect can be negligible. The reason for this is that transmission with a predetermined beam pattern (direction) constantly interferes with other UEs to result in stable interference in the time domain.

In contrast, the adaptive beamforming transmission constantly changes the interference with a UE by dynamic UE scheduling or by the movement of the UE. One of the factors causing the flash light effect is that a scheduler dynamically and rapidly assigns a beamformed channel to an active UE one after another at high speed.

Accordingly, a communication opponent (active UE) is dynamically scheduled (selected) without considering the DoA of each UE to direct (switch) the beam to be transmitted toward the active UE. This significantly changes the interference by the flash light effect.

(1.2) UE Scheduling Based on DoA

Addition of the DoA of a UE as one of the parameters for scheduling is proposed as one measure for reducing the flash light effect that may be caused in the adaptive beamforming transmission.

For example, a BS classifies UEs in a serving cell (or sector (hereinafter the same shall apply)) of the BS based on the DoA of the UEs to select (schedule) an active UE (index) according to this classification. In the case capable of communication between BSs, the DoA of a UE in an adjacent cell can also be acquired. From a viewpoint of the control for transmission of a beam, this scheduling corresponds to the control of the order (direction) of transmission of the beam toward each UE based on the classification (DoA).

For example, as illustrated in FIG. 3, the beams transmitted from $BS_1$ toward $UE_{11}$, $UE_{12}$, $UE_{13}$, and $UE_{14}$ cause interferences (PSD), which may overlap with each other in an angular direction. The same is true of FIG. 4. These overlaps of interference PSD tend to increase with an increase in the number of UEs in the cell of $BS_1$ (or $BS_2$).

For these overlaps of interference waves, a transmitted beam is switched (direction-controlled) only to another transmitted beam continuing to interfere with a UE in an adjacent cell before and after the switching, which can minimize a change in the interference with the UE.

For example, $BS_1$ switches the active UE (direction of a beam to be transmitted) from $UE_{11}$ to $UE_{12}$ instead of switching the active UE from $UE_{11}$ to $UE_{14}$ in FIG. 3, thereby continuing to interfere with $UE_{21}$ in the adjacent cell before and after switching the beam. This can minimize a change in the interference with $UE_{21}$.

The same is true of switching the beam by $BS_2$. $BS_2$ switches the active UE (direction of a beam to be transmitted) from $UE_{21}$ to $UE_{22}$ instead of switching the active UE from $UE_{21}$ to $UE_{24}$. This process can minimize a change in the interference with $UE_2$, in the adjacent cell (see FIG. 4).

Thus, a BS sets an adjacent UE in an angular direction as an active UE based on the DoA of the UE. This scheduling (controlling the direction of a beam to be transmitted) based on the DoA can stabilize the interference with the UE in a cell by another adjacent cell. This can improve the effect of variability of SINR for a receiving UE. As a result, for example, cell (or sector) throughput or user coverage can be improved.

Therefore, a BS preferably controls the direction of a beam to be transmitted (scheduling) based on the positions of UEs managed by the BS such that the interference with a region which is wide as much as possible continues before and after switching the beam. The position of a UE can be estimated by measuring its DoA. A DoA can be measured (estimated) by, for example, a beamforming technique, a linear predictive technique, a minimum-norm solution based on eigenvalue expansion of a correlation matrix, and a parametric approach. For example, the beamforming technique can change the direction of the highest gain (main lobe) of an antenna beam in an angular direction to measure its power, thereby estimating a DoA.

Figure 5:
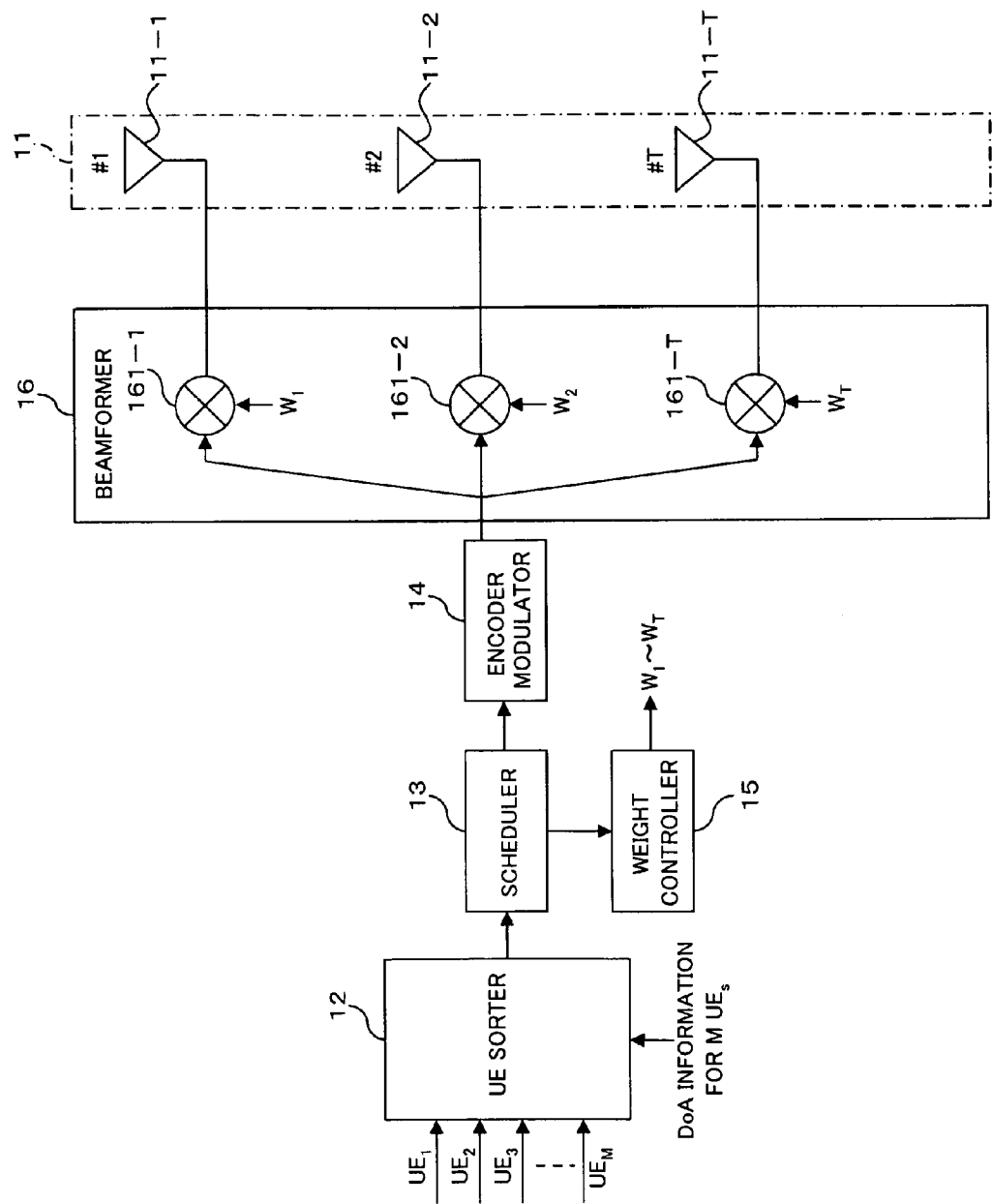
FIG. 5 is a block diagram illustrating an exemplary configuration of a BS in accordance with an embodiment.

FIG. 5 illustrates an exemplary configuration of a BS scheduling UEs based on their DoA as described above. This BS exemplarily includes T transmitting antennas 11-1 to 11-T (#1 to #T; where T is an integer equal to or more than two), a UE sorter 12, a scheduler 13, an encoder/modulator 14, a weight controller 15, and a beamformer 16. The beamformer 16 exemplarily includes weight multipliers 161-1 to 161-T for the transmitting antennas #1 to #T, respectively.

The transmitting antennas 11-1 to 11-T each transmit a wireless signal to the wireless area of the corresponding BS. The transmitting antennas 11-1 to 11-T function as an adaptive array antenna 11 such that the direction of a beam radiating from each transmitting antenna can be adaptively controlled.

The UE sorter 12 sorts $UE_1$ to $UE_M$ in ascending (or descending) order based on information about the DoA of $UE_1$ to $UE_M$ managed by the BS to newly index the UEs. The DoA can be measured by, for example, the beamforming technique. The DoA of a UE measured by another BS can also be acquired by communication between the BSs.

The scheduler 13 selects a correspondent UE to be active according to the order of the UEs sorted (newly indexed) by the UE sorter 12, and sends information about the active UE to the weight controller 15.

The weight controller 15 generates weighting coefficients (antenna weights) $W_1$ to $W_T$ for the active UE selected by the scheduler 13, the weighting coefficients being used for beamforming (directing) a beam to be transmitted to the UE. The antenna weights $W_1$ to $W_T$ are sent to the corresponding weight multipliers 161-1 to 161-T, respectively.

Accordingly, the UE sorter 12, the scheduler 13, and the weight controller 15 are used as an exemplary control unit for controlling the direction of a beam radiating from the adaptive array antenna 11.

The encoder/modulator 14 encodes and modulates data to be transmitted to the active UE selected by the scheduler 13. Modulation systems such as QPSK, 16QAM, and 64QAM can be used. Encoding (decoding) systems such as a turbo encoding (decoding) system can be used. A modulated signal is inputted to the weight multipliers 161-1 to 161-T, respectively, in the beamformer 16.

In the beamformer 16, the weight multipliers 161-1 to 161-T multiply the modulated signal by the antenna weights $W_1$ to $W_T$, respectively, sent from the weight controller 15. This controls the direction of a beam radiating from the adaptive array antenna 11 so as to direct the beam toward the active UE selected by the scheduler 13, and transmits the data to the active UE by a wireless signal.

Figure 6:
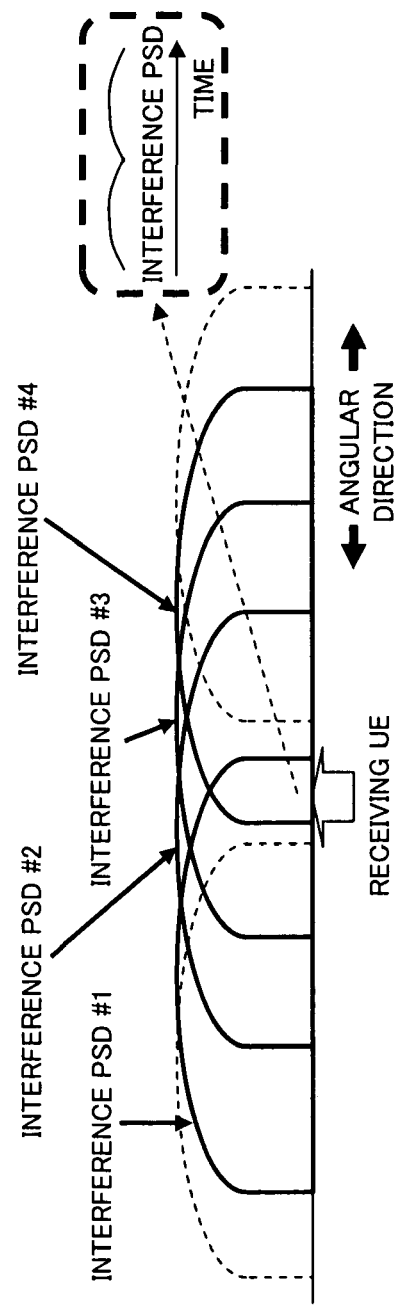
FIG. 6 illustrates scheduling based on DoA in the BS illustrated in FIG. 5.

FIG. 6 illustrates an exemplary interference PSD profile of a receiving UE with respect to an angular direction. In FIG. 6, for interference with a receiving UE (in an adjacent cell), in sequence, by PSD#1, PSD#2, PSD#3, PSD#4, PSD#3, PSD#2, and PSD#1 with time, the interference PSD profile in the time domain is stable compared with that by irregular interference.

Accordingly, the UE sorter 12 in a BS sorts UEs managed by the BS, for example, in ascending (or descending) order based on the DoA of the UEs to index the UEs according to the order. The scheduler 13 schedules (selects) an active UE according to its index.

In the exemplary case of FIGS. 2 and 3, the UE sorter 12 in $BS_1$ newly indexes $UE_{11}$, $UE_{12}$, $UE_{13}$, and $UE_{14}$ managed by $BS_1$ with 1, 2, 3, and 4, respectively, based on the DoA of these UEs. Therefore, the scheduler 13 in $BS_1$ cyclically selects an active UE in the sequence of, for example, $UE_{11}$, $UE_{12}$, $UE_{13}$, $UE_{14}$, $UE_{13}$, $UE_{12}$, and $UE_{11}$ with a predetermined period (scheduling timing). The same can also be true of scheduling in $BS_2$.

This can reduce a change in interference (influence of the flash light effect) with the UE in an adjacent cell. The similar UE-sorting and scheduling by $BS_2$ can also reduce a change in interference with the UE in an adjacent cell.

This means controlling the order of transmission of the beams toward at least three UEs based on the directions of the beams corresponding to the UEs.

Figure 7:
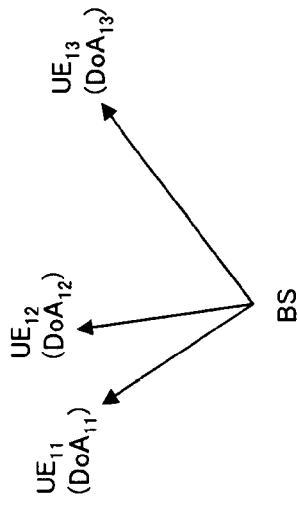
FIG. 7 is a schematic diagram illustrating control of the direction of the transmitted beam.

This control for three UEs ($UE_{11}$, $UE_{12}$, and $UE_{13}$) in the above-described UEs will be described from a viewpoint of the control of the direction (controlled variable in an angular direction) of a beam to be transmitted. The directions (DoA) corresponding to $UE_{11}$, $UE_{12}$, and $UE_{13}$ will be referred to as $DoA_{11}$, $DoA_{12}$, and $DoA_{13}$ (a first direction, a second direction, and a third direction), respectively (see FIG. 7).

$BS_1$ schedules, in sequence $UE_{11}$, $UE_{12}$, and $UE_{13}$ as described above, which corresponds to directing beams to be transmitted, in sequence, to $DoA_{11}$, $DoA_{12}$, and $DoA_{13}$ when the shift from $DoA_{11}$ to $DoA_{12}$ in an angular direction is less than that from $DoA_{11}$ to $DoA_{13}$. This control can result in less controlled variable of beams to be transmitted in an angular direction than that in the case of directing the beams, in sequence, to $DoA_{11}$, $DoA_{13}$, and $DoA_{12}$.

Figure 8:
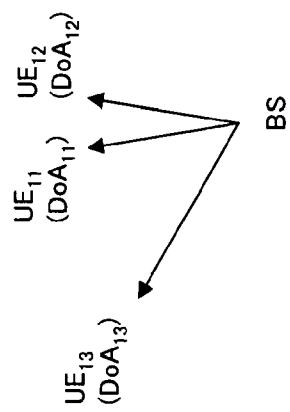
FIG. 8 is a schematic diagram illustrating control of the direction of the transmitted beam.

However, when the shift from $DoA_{11}$ to $DoA_{12}$ in an angular direction is less than that from $DoA_{11}$ to $DoA_{13}$, these three DoAs may also reside in the sequence of $DoA_{13}$, $DoA_{11}$, and $DoA_{12}$ in an angular direction (see FIG. 8). In this case, by directing beams to be transmitted, in sequence, to the first, second, and third directions ($DoA_{11}$, $DoA_{12}$, and $DoA_{13}$), the direction of the transmitted beams needs to be controlled so as to return from $DoA_{12}$ to $DoA_{13}$ for a large angle. This is an inefficient control. In order to eliminate this, a condition can be added such that the shift from $DoA_{12}$ to $DoA_{13}$ is less than that from $DoA_{11}$ to $DoA_{13}$.

(1.3) UE Scheduling Based on DoA for Multi-Beam Transmission

For multi-beam (for example, N beams) transmission, a BS classifies UEs into N groups based on the DoA of the UEs, and sorts the UEs based on their DoA in each group as described above to cyclically schedule an active UE.

Figure 9:
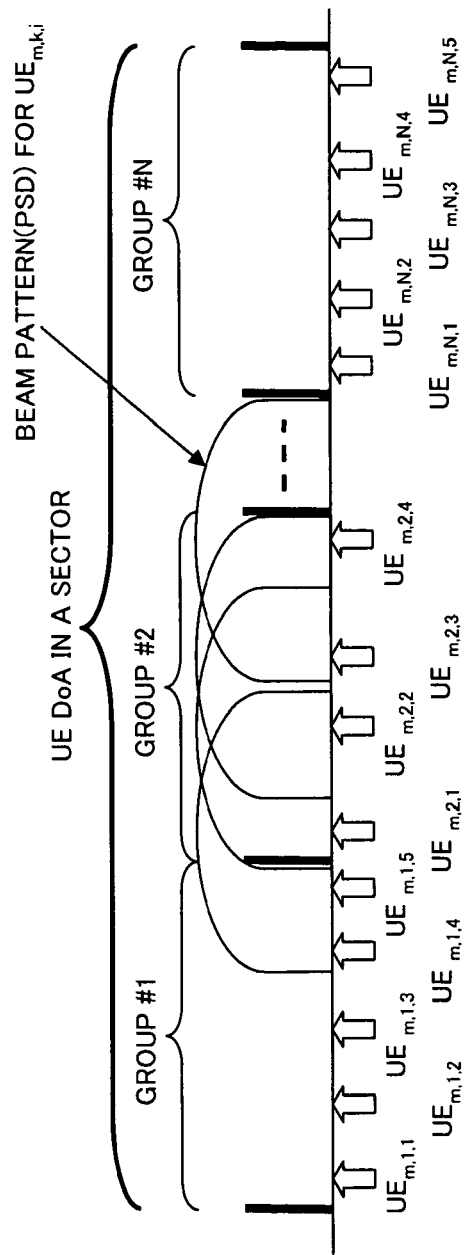
FIG. 9 illustrates UE scheduling based on DoA for multi-beam transmission.

FIG. 9 illustrates that the DoA of a UE is irregularly assigned in an m-th sector of an adjacent cell. This BS classifies each $UE_{m,k,i}$ into N groups #1 to #N based on its DoA. Meanwhile, a suffix k indicates the index of a group while a suffix i indicates the index of a UE.

In this exemplary case, five UEs ($UE_{m,1,1}$ to $UE_{m,1,5}$) are included in the group #1, four UEs ($UE_{m,2,1}$ to $UE_{m,2,4}$) in the group #2, and five UEs ($UE_{m,N,1}$ to $UE_{m,N,5}$) in the group #N.

The BS sorts the UE$_{m,k,i}$ in ascending (or descending) order based on its DoA in each group #k to cyclically select an active UE in this order.

Figure 10:
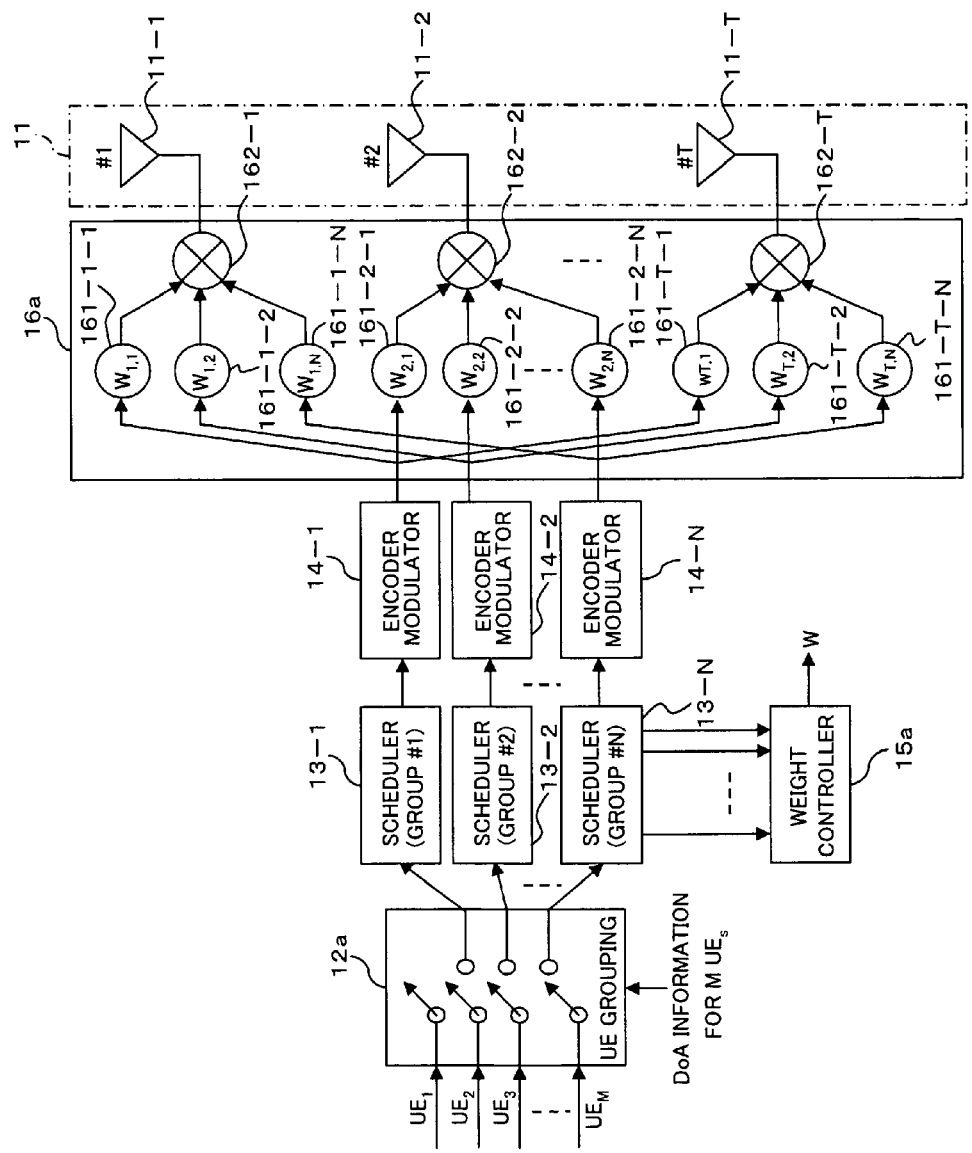
FIG. 10 is a block diagram illustrating an exemplary configuration of a BS for the UE scheduling based on DoA for multi-beam transmission.

FIG. 10 illustrates an exemplary configuration of a BS scheduling UEs by this classifying. This BS exemplarily includes T transmitting antennas 11-1 to 11-T (#1 to #T), a UE grouping unit 12a, schedulers 13-1 to 13-N and encoder/modulators 14-1 to 14-N for the N groups, a weight controller 15a, and a beamformer 16a. The beamformer 16a exemplarily includes T×N weight multipliers 161-j-k (j=1 to T; k=1 to N), and adders 162-1 to 162-T for the transmitting antennas 11-1 to 11-T, respectively.

In this example, the transmitting antennas 11-1 to 11-T each also transmits a wireless signal to a wireless area of the corresponding BS, and functions as an adaptive array antenna 11 such that the direction of a beam radiating from each transmitting antenna can be adaptively controlled.

The UE grouping unit 12a classifies the UEs (UE$_1$ to UE$_M$) based on its DoA into the N UE groups #1 to #N according to information about the DoA of the UEs (UE$_1$ to UE$_M$ managed by the corresponding BS. Exemplarily, UEs having DoA in a predetermined angular range will be set into one group. For this grouping, information about DoA of UEs in an adjacent cell can also be acquired by communication between BSs to consider this information.

Each scheduler 13-k sorts UEs in the UE group #k corresponding to the scheduler in a similar manner (indexing) to the UE sorter 12, and selects an active UE according to the result of the sorting. Then, information about this active UE is sent to the weight controller 15a.

The weight controller 15a generates weighting coefficients (antenna weights) W$_{x,k}$ for the active UE selected by each scheduler 13-k, the weighting coefficients being used for directing a beam to be transmitted to the UE. Then, these antenna weights are sent to the corresponding weight multipliers 161-x-y.

Accordingly, the UE grouping unit 12a, the scheduler 13-k, and the weight controller 15a are used as an exemplary control unit for controlling the direction of a beam radiating from the adaptive array antenna 11.

Each encoder/modulator 14-k encodes and modulates data to be transmitted to the UE selected by the corresponding scheduler 13-k. In this example, modulation systems such as QPSK, 16QAM, and 64QAM can also be used. Encoding (decoding) systems such as a turbo encoding (decoding) system can be used. A modulated signal obtained by each encoder/modulator 14-k is inputted to the corresponding weight multiplier 161-x-k in the beamformer 16a.

In the beamformer 16a, each weight multiplier 161-x-k multiplies the modulated signal by the corresponding antenna weight W$_{x,k}$ sent from the weight controller 15a. This directs (beamforms) multi-beams to be transmitted toward the N active UE selected by the corresponding scheduler 13-k to transmit a wireless signal from each transmitting antenna #11-x to the corresponding active UE.

In this example, a wireless signal toward one active UE for each group #k is sent by one beam. However, this example is not restricted to this. Depending on the selected active UEs, beams to be transmitted in adjacent groups #k may overlap with one another.

(1.4) An Additional Rule for Scheduling

In a wireless communication system, a channel is based on, for example, code division multiplex (CDM) or frequency division multiplex (FDM). A channel based on CDM can be set as a channel such that one active UE occupies an entire system frequency band. Therefore, a frequency resource assigned to the active UE does not rapidly change by its scheduling.

In contrast, a channel based on FDM is set such that parts of its system frequency band are assigned to the respective UEs. In an orthogonal frequency division multiple access (OFDMA) system, a minimum transmission unit is defined by a predetermined subchannel including the predetermined number of carriers (frequencies) and locations in a time direction.

Therefore, in FDM and OFDMA systems, if a channel (capable of including some subchannels) assigned to an active UE significantly changes in the frequency domain, this can cause a frequency suddenly occurring and disappearing to a receiving UE. In this case, the flash light effect by beamforming transmission may remain even by the above-described scheduling based on DoA.

Therefore, in scheduling (assigning a channel) by a system such as FDM and OFDMA in the frequency domain, it is not preferred that a frequency resource (subband including some subchannels) assigned to the active UE significantly changes.

Therefore, the UE grouping unit 12a preferably classifies UEs into groups based on the DoA in one channel (frequency resource including some subchannels) for a predetermined period, and gradually shifts a transmission channel to another channel in a different subband (frequency resource).

(2) Variations (2.1) Scheduling by the Modified Direction of a Beam

For DoA of two UEs being significantly away from each other in an angular direction, directing a beam to be transmitted so as to maximize a received SINK of one of the UEs may generate a region without overlap of PSD patterns.

Figure 11:
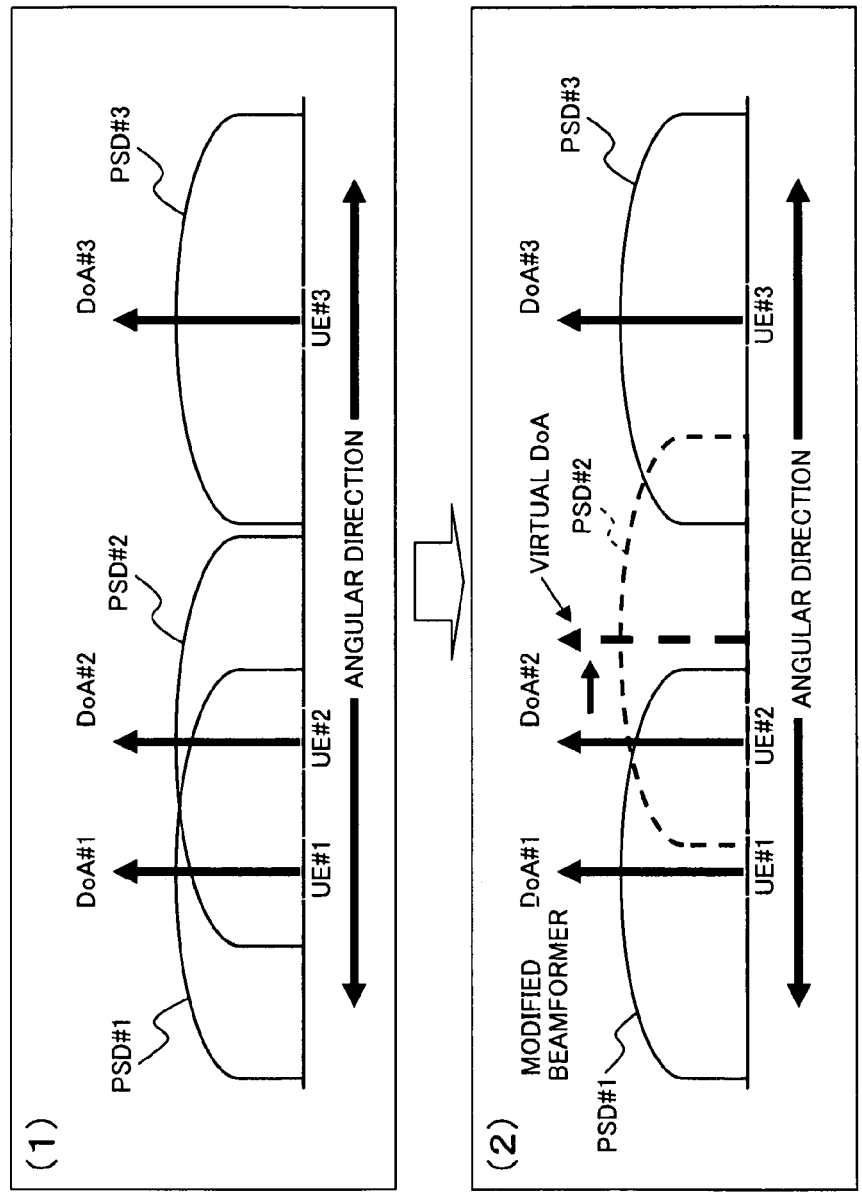
FIG. 11 illustrates scheduling using the modified direction of a beam in a variation of an embodiment.

FIG. 11 illustrates one example of this. This drawing illustrates that three UEs (UE#1, UE#2, and UE#3) managed by a BS have DoA#1, DoA#2, and DoA#3, and correspond to patterns of PSD#1, PSD#2, and PSD#3, respectively, by beams to be transmitted toward the respective UEs.

As illustrated in FIG. 11(1), PSD#1 partially overlaps with PSD#2 in the angular direction. In contrast, PSD#3 does not overlap with either PSD#1 or PSD#2, and causes a gap between PSD#2 and PSD#3.

In this case, it is assumed that the BS currently transmits a beam toward UE#1 in DoA#1, and then selects UE#2 in DoA#2 as the active UE in the next scheduling timing to direct the transmitted beam toward UE#2. In this case, by directing the transmitted beam in DoA#2, PSD#2 may not overlap with PSD#3. Thereby, a significant change in the interference (the flash light effect) may affect an adjacent cell.

Accordingly, the control unit of the BS modifies the direction of a beam to be transmitted toward UE#2 based on DoA#3 of UE#3 to be selected in the next scheduling timing, instead of directing the transmitted beam just based on DoA#2.

For example, the control unit of the BS estimates a virtual DoA of UE#2 based on DoA#2 and DoA#3. As indicated by a dashed line in FIG. 11(2), the virtual DoA is exemplarily defined as DoA such that PSD#2 by a beam to be transmitted toward UE#2 overlaps with PSD#3 by a beam to be transmitted toward UE#3.

This corresponds to control of transmission of a beam to UE#1 to transmit a first wireless signal, and control of the direction (virtual DoA) of the beam within a predetermined shift from the direction of the first wireless signal to transmit a second wireless signal at a timing after the timing of the control for the first wireless signal. In this case, the second wireless signal transfers data for UE#2. The timing after the timing of the control for the first wireless signal may be within a predetermined period from the timing of the control for the first wireless signal, and is defined based on, for example, a cycle of scheduling.

Based on the timing after the timing of the control for the first wireless signal, in other words the next scheduling timing (UE#2), this control corresponds to control of transmission of a beam to UE#2 to transmit a first wireless signal, and control of the direction of the beam within a predetermined shift from the direction of the first wireless signal to transmit a second wireless signal at a timing before the timing of the control for the first wireless signal. In this case, the second wireless signal transfers data for UE#1.

Thus, this BS (control unit) controls the direction of a beam to be transmitted so as to aggressively cause the foresight or residual of PSD by the transmitted beam in an angular direction, instead of perfectly directing the transmitted beam toward UE#2 to be active. This control can reduce a region in which the PSD suddenly occurs and disappears to cause the flash light effect.

(2.2) A Scheduler by a Proportional Fairness (PF) Algorithm

A round-robin (RR) algorithm and a proportional fairness (PF) algorithm may be applied to the above-described methods for scheduling by the control unit (scheduler 13 or 13-$k$). Application of the PF algorithm can improve multi-user diversity gain.

The PF algorithm preferentially selects a UE having the highest rate (R/T) of a transmission rate (R) required by the UE to an average receiving rate (T) for a predetermined period (window size) as an active UE. This can improve efficiency in the use of a wireless resource and fairness of opportunities for transmission between UEs.

In application of the PF algorithm to the above-described methods for scheduling based on DoA, the PF algorithm can also be applied to only several UEs (for example, (2M+1) UEs). In this case, M is preferably set to a small number (for example, several UEs).

Exemplary steps for scheduling K UEs in a group #n will be described below.

First, a BS (scheduler 13-$k$) determines a candidate UE based on its DoA as described above. This UE is indicated by $UE_{n,k}$.

Next, the scheduler 13-$k$ selects UEs including the candidate $UE_{n,k}$ for PF scheduling based on the DoA in the group #n. This process can select UEs (for example, (2M+1) UEs) adjacent to the candidate $UE_{n,k}$ in an angular domain. In this case, the (2M+1) UEs are represented as follows:

$UE_{n,k-M}, \ldots, UE_{n,k}, \ldots, UE_{n,k+M}$, where (k−M)>0 and (k+M)<(K+1).

Then, the BS (scheduler 13-$k$) processes the (2M+1) UEs ($UE_{n,k-M}, \ldots, UE_{n,k}, \ldots, UE_{n,k+M}$) including the candidate $UE_{n,k}$ by PF scheduling. The maximum number of UEs to be processed by the PF scheduling is equal to 2M+1, and the minimum number of the UEs to M+1.

Figure 12:
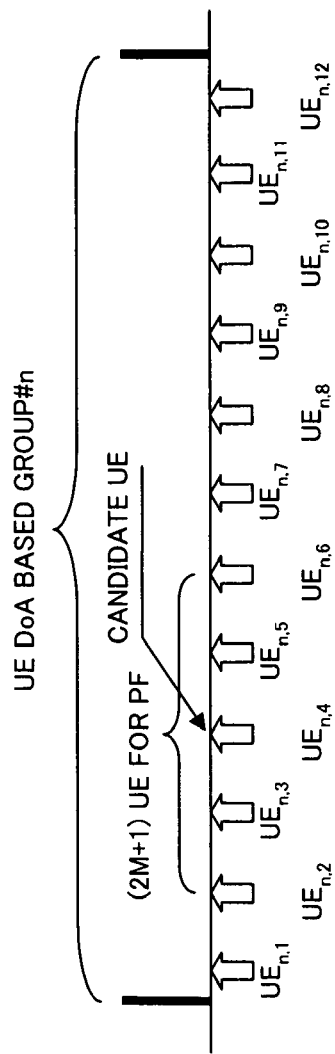
FIG. 12 illustrates an exemplary method for scheduling by applying a PF algorithm.

FIG. 12 illustrates an exemplary method by the PF scheduling where K=12 and M=2. This drawing illustrates that a candidate UE in the group #n at a certain timing is $UE_{n,4}$, and UEs ($UE_{n,2}$, $UE_{n,3}$, $UE_{n,5}$, and $UE_{n,6}$) adjacent to this candidate $UE_{n,4}$ in an angular direction are processed by the PF scheduling, these four UEs consisting of the two UEs in each side in an angular direction.

Regardless of which UE has been determined as the active UE in the last scheduling timing, the scheduler 13-$k$ processes $UE_{n,3}$, $UE_{n,4}$, $UE_{n,5}$, $UE_{n,6}$, and $UE_{n,7}$ by the PF scheduling if the candidate UE is set to $UE_{n,5}$ in the next scheduling timing.

Depending on which UE is set to the candidate UE in the group #n, the number of the UEs to be processed by the PF scheduling may be lower than 2M+1. For example, if k+2>13 and the candidate UE in FIG. 12 is set to $UE_{n,11}$, the scheduler 13-$k$ processes four UEs ($E_{n,9}$, $UE_{n,10}$, $UE_{n,11}$, and $UE_{n,12}$) by the PF scheduling, the number of these UEs being lower than 2M+1=5. The same is true if k−2<0. For example, if the candidate UE in FIG. 12 is set to $UE_{n,2}$, the scheduler 13-$k$ processes four UEs ($UE_{n,1}$, $UE_{n,2}$, $UE_{n,3}$, and $UE_{n,4}$) by the PF scheduling, the number of these UEs being lower than 2M+1.

The embodiments and the variations as described above can reduce the flash light effect caused by adaptive beamforming transmission in multi-beam transmission by scheduling UEs based on the DoA. Therefore, SINR of the UE as a receiver can be improved. As a result, for example, cell (or sector) throughput or user coverage can also be improved.

Application of the PF algorithm to scheduling based on DoA can also improve the multi-user diversity gain. A BS in the above-described embodiments and variations can also communicate with another BS defining an adjacent cell (or sector). In such a case, the above-described scheduling based on DoA can be applied, and more smoothly control a beam to be transmitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) has (have) been described in detail, it should be understood that the various changes, substitutions, and alterations could be made hereto without departing from the spirit and scope of the invention.

What is claimed is:

1. A wireless communication device capable of controlling the direction of beams to be transmitted, the wireless communication device comprising:

an adaptive array antenna; and a controller that controls the directions of the beams radiating from the adaptive array antenna, wherein the controller controls the order of transmission of the beams toward at least three correspondent wireless communication devices based on the directions of the beams corresponding to the correspondent wireless communication devices, the wireless communication devices include a first wireless communication device, a second wireless communication device, and a third wireless communication device, the first, second, and third wireless communication devices corresponding to a first direction, a second direction, and a third direction, respectively, and the transmitted beams are directed, in sequence, to the first, second, and third directions where the shifted beam-width from the first direction to the second direction is less than the shifted beam-width from the first direction to the third direction.

2. The wireless communication device according to claim 1, wherein the shifted beam-width from the second direction to the third direction is less than the shifted beam-width from the first direction to the third direction.

3. A method for controlling a beam to be transmitted by a wireless communication device capable of controlling the direction of beams to be transmitted by an adaptive array antenna, the method comprising:

controlling the order of transmission of the beams toward at least three correspondent wireless communication devices based on the directions of the beams corresponding to the correspondent wireless communication devices, wherein the wireless communication devices include a first wireless communication device, a second wireless communication device, and a third wireless communication device, the first, second, and third wireless communication devices corresponding to a first direction, a second direction, and a third direction, respectively, and the transmitted beams are directed, in sequence, to the first, second, and third directions where the shifted beam-width from the first direction to the second direction is less than the shifted beam-width from the first direction to the third direction.

* * * * *